April 13, 1954     A. J. RENELT     2,674,840
STRAW BUNCHING ATTACHMENT FOR PULL-TYPE COMBINES
Filed Nov. 22, 1950     2 Sheets-Sheet 1
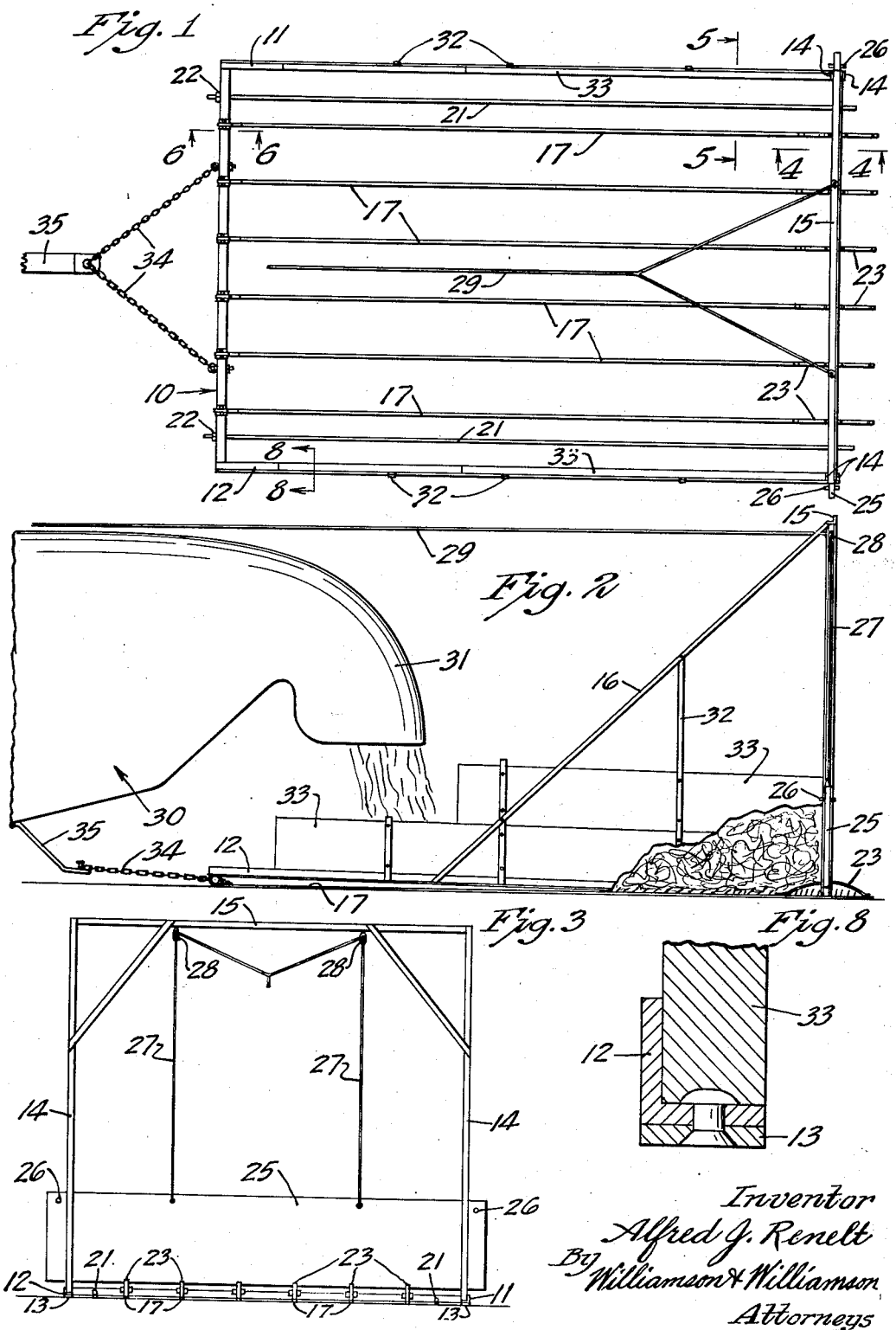

April 13, 1954      A. J. RENELT      2,674,840
STRAW BUNCHING ATTACHMENT FOR PULL-TYPE COMBINES
Filed Nov. 22, 1950      2 Sheets-Sheet 2
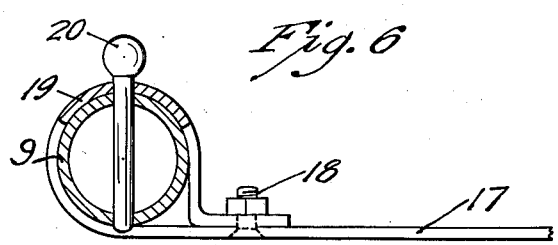
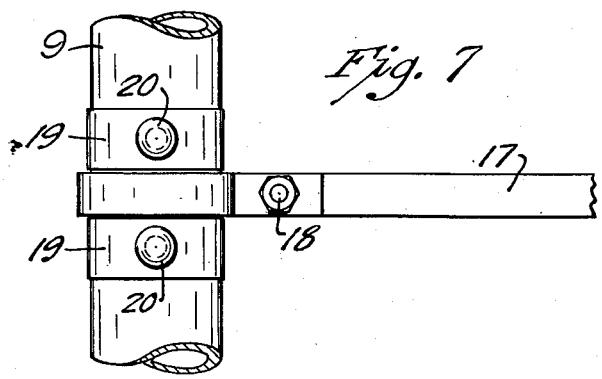
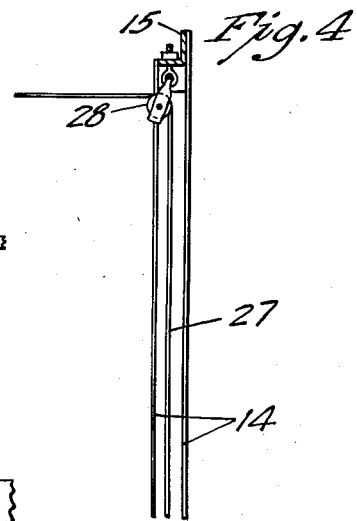
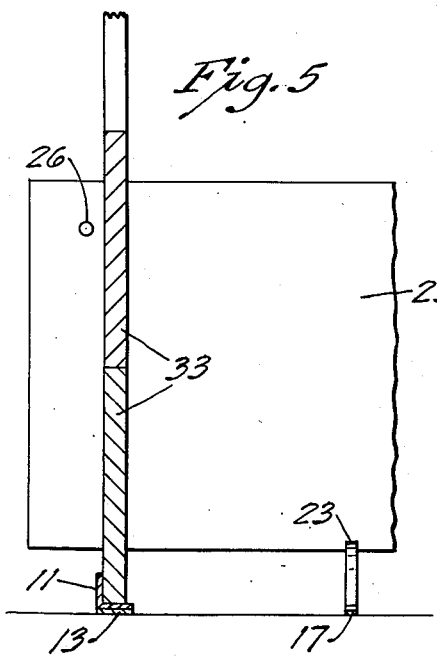
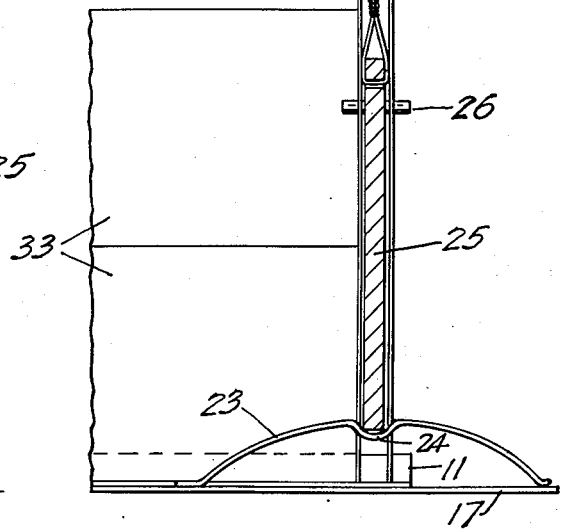
Inventor
Alfred J. Renelt
By Williamson & Williamson
Attorneys Patented Apr. 13, 1954

2,674,840

UNITED STATES PATENT OFFICE 2,674,840

STRAW BUNCHING ATTACHMENT FOR PULL-TYPE COMBINES

Alfred J. Renelt, Wilmot, S. Dak.

Application November 22, 1950, Serial No. 196,965

4 Claims. (Cl. 56—473.5)

This invention relates to a stalk and straw bunching attachment for combines and the like.

Farmers, and especially farmers in the areas where small grains are raised in large quantities, have in recent years come to realize the importance of returning the stalks and straw of the crops which they raise to the soil upon which it was grown in order to provide sufficient humus to the soil to maintain the soil in a loose, porous, moisture-retaining condition. As a result, these farmers have sought to eliminate the practice of burning the straw after it has been discharged by the combines used to harvest the grain, a practice, which in the past, has been all too frequent. With the increase in dairying in many of these areas, as well as other activities which utilize straw for bedding, etc., a need has arisen for an attachment for a combine which will bunch the straw as it is discharged from the combine to permit the same to be gathered and hauled to a barn or similar structure with a minimum of inconvenience and effort.

It is a general object of my invention to provide a novel stalk and straw bunching attachment for a combine or the like of cheap and simple construction and efficient operation.

A more specific object is to provide an attachment for securement adjacent the discharge of a combine or the like adapted to bunch the straw as it is discharged from the combine and to be readily controlled by the operator of the combine without dismounting, and while the combine is in progress.

A further object is to provide a stalk and straw bunching attachment for a combine or the like which will efficiently bunch the straw in relatively large bunches without permitting any of the straw to be released prematurely.

These and other objects and advantages of my invention will more fully appear from the following description made in connection with the accompanying drawings wherein like reference characters refer to the same or similar parts throughout the several views and in which:

Figure 1 is a top plan view of one embodiment of my invention.

Figure 2 is a side elevational view with parts broken away of the same shown urged behind the discharge end of a combine.

Figure 3 is a rear elevational view of the device.

Figure 4 is an enlarged fragmentary longitudinal and vertical sectional view taken along line 4—4 of Figure 1.

Figure 5 is an enlarged fragmentary vertical and longitudinal sectional view taken along line 5—5 of Figure 1.

Figure 6 is an enlarged sectional view taken along line 6—6 of Figure 1, only a part of the collar being shown.

Figure 7 is an enlarged fragmentary top elevational view of the draw bar.

Figure 8 is an enlarged sectional view taken along line 8—8 of Figure 1.

One embodiment of my invention includes, as shown in Figures 1-8, a horizontally arranged U-shaped frame indicated generally as 10, the arms of this frame extending rearwardly. Each of the arms, 11 and 12, is provided with a detachable shoe 13. Welded to the rear ends of each of the arms 11 and 12 and extending vertically therefrom is a pair of spaced guide bars 14. These guide bars 14 are each welded or secured in some other suitable manner at their upper ends to a transversely extending angle iron 15. Each end of the transverse angle iron 15 is braced by a diagonally extending support arm 16, the lower end of which is secured to the respective arm 11 or 12 of the frame 10 by welding or in some other suitable manner.

Pivotally mounted on the frame 10 to its transversely extending bar 9 is a plurality of uniformly spaced support rods 17. The forward transverse bar of the fram 10 is preferably cylindrical in shape as best shown in Figures 6 and 7, and the support rods 17 may be pivoted thereon by having their forward ends doubled rearwardly in a manner to encircle the bar 9 as best shown in Figure 6. The support rods 17 may be secured in this manner by bolts 18 or in some other suitable manner such as with rivets. As shown, the support rods 17 may be prevented from moving transversely with respect to the frame 10 by a pair of spaced half rods or collars 19 which are secured to the transverse bar of the frame 10 on either side of the loop portion of the support rods 17 by a metal pin 20 which extends downwardly therethrough and into the transverse bar of the frame 10 through apertures provided therefor. If desired, additional rods 21 may be mounted on the transverse bar of the frame 10 by simply drilling a hole through the transverse bar, threading the forward end of the rods 21, and securing a burr 22 thereon after the rod has been inserted through the frame 10.

Secured to the rear end portions of the support rod 17 is an arcuately shaped guard member indicated generally as 23 which extends upwardly therefrom. As best shown in Figure 4, the medial portion of the guard member 23 has a depression 24 formed therein which is aligned with a line extending between the opposed guide bars 14. The slope of the guard member 23 is sufficient so that the upper extremity thereof will be disposed well above the plane in which the support rods 17 lie.

Carried between the assorted guide bars 14 and extending transversely with respect to the support rods 17, is an end gate 25 or abutment member which when in lowered position, rests within the depressions 24 of the guard member 23. This end gate 25 has extending therethrough as best shown in Figure 3, a pair of transversely arranged lock pins 26 which serve to prevent the end gate from working transversely with respect to the guard members sufficiently far to cause one end thereof to escape the guide bars 14. Secured to the end gate 25 in spaced relation and in any suitable manner, is a pair of lift ropes or cables 27 which extend upwardly therefrom and pass through a pair of spaced pulleys 28 which are arranged directly overhead and secured to the angle iron 15. These lift ropes 27 are joined after passing through the pulley 28 and connected, as best shown in Figure 1, to a trip rope 29. This trip rope extends forward beyond the frame to a position where it is accessible by the operator of the combine 30, the discharge end 31 of which is best shown in Figure 2. Secured to each of the side arms 11 and 12 by means of a plurality of support straps 32 which are welded or otherwise rigidly secured to the side arms, is a plurality of side board members 33. These side board members are vertically arranged to provide in combination with the end gate 25 when the latter is in lowered position, a substantially closed compartment. As best shown in Figure 2, these side board members 33 do not extend forwardly the full length of the arms 11 and 12 of the frame 10.

Secured to the transverse bar of the frame 10 is a draw chain 34 which in turn may be secured in any suitable manner to the draw bar 35 of the combine 30.

In operation the structure shown in Figure 1 is hitched to the draw bar 35 of the combine 30 and drawn therebehind as the combine moves forwardly across the grain field. The straw which is discharged from the discharge outlet 31 of the combine will be received within the confines of the frame 10 as best shown in Figure 2. The straw will be deposited upon the support rods 17 as these rods slide along over the ground. The stubble of the grain stalk will extend upwardly between the respective support rods 17 and will carry the straw rearwardly until it reaches the guard members 23. As the straw is engaged by the guard members 23, it is carried upwardly thereover and lodges against the abutment member 25. As this continues, the straw accumulates into a relatively large bunch until the operator of the combine pulls on the trip rope 29 and thereby draws the abutment member 25 upwardly to release the straw in a bunch at a desired location. Upon the release of the trip rope, gravity, of course, will cause the abutment member 25 to return to its lowered position where it returns within the depressions 24 of the guard members 23. The side board members 33 prevent the straw from working laterally beyond the confines of the frame 10. The support rods 17 support the straw so that it is not drawn through loose dirt and thereby reduced in value. In this regard it should be noted that the support rods 17 are free to pivot vertically with respect to the frame 10 to allow the same to conform with the contour of the surface of the grain field. The depressions 24 of the guard members 23, and the guard members 23 themselves are very important in the bunching operation. It has been found that if an abutment member is drawn in the rear of the frame 10 in close proximity to the ground, that the straw will tend to work thereof and gradually accumulate to raise the abutment member 25 and cause some of the straw to be released prematurely in small scattered clumps. To prevent this, I have provided the guard members which serve to elevate the straw as it is carried rearwardly and to cause the straw to lodge against the abutment member 25 at a point above its lower edge. Thus the straw is positively prevented from working beneath the lower edge of the abutment member 25 and premature releasing of the straw is prevented.

The removable shoes 13 on the arms 11 and 12 are provided as skids upon which the frame 10 may slide. These shoes 13 are made removable so that they may be replaced when they become worn.

It should be noted that I have provided a simple and cheap structure which will efficiently bunch the straw as it is discharged from the combine and which will permit the operator to release such bunches as desired without dismounting from the combine. The device is easy to operate and cheap to manufacture yet highly efficient.

It will, of course, be understood that various changes may be made in the form, details, arrangement and proportions of the parts without departing from the scope of my invention.

What I claim is:

1. A stalk and straw bunching attachment for combines and the like comprising a horizontally extending frame adapted to be drawn over the ground adjacent the discharge of the combine in position to receive stalks or straw therefrom, said frame having opposed upstanding side members mounted thereon, a plurality of spaced rearwardly extending support elements pivotally connected by their forward portions to the forward portions of the frame and arranged within the confines thereof, abutment means carried by said frame at the rear portion thereof and having a lower edge and being controllably releasable to permit accumulations of straw to be released as desired, and a plurality of elevated guard members one each of which is secured to the rear portions of one of said support elements, each of said elevated guard members having a depression formed in its medial portion and supporting said abutment member therein and maintaining the lower edge of the same at an elevation well above the level of said support elements and the ground.

2. A stalk and straw bunching attachment for combines and the like comprising a frame adapted to be drawn over the ground adjacent the discharge of the combine in position to receive stalks or straw therefrom, a plurality of rearwardly extending support elements connected to the forward portions of said frame and disposed within the confines of said frame to support such straw, said support elements being spaced laterally of said frame to permit the stubble of the grain to extend upwardly therethrough to cause the straw to move rearwardly thereover, a controllable abutment means adjacent the rear portions of said frame and having a lower edge, said means providing a stop for such straw as it accumulates thereagainst, and means for simultaneously supporting the lower edge of said abutment means in elevated position relative to said support elements and the ground and for positively directing such straw upwardly against said abutment means to a level above its lower edge to prevent such straw from slipping therebeneath and causing said abutment means to release such straw prematurely.

3. A stalk and straw bunching attachment for a combine or the like comprising a frame adapted to be drawn over the ground adjacent the discharge of the combine in position to receive stalks or straw therefrom, a plurality of support elements connected to the forward portion of said frame and extending rearwardly within the confines of said frame to support such straw, said support elements being spaced laterally of said frame to permit the grain stubble to extend upwardly therethrough to move such straw rearwardly thereover, an abutment member mounted for vertical sliding movement adjacent the rear portion of said frame and having a lower edge, and guard means extending directly ahead of said member and upwardly to a level above the lower edge thereof for positively preventing such straw from slipping beneath said abutment member and causing it to be lifted upwardly whereby such straw may be released prematurely, said guard means also extending beneath the lower edge of said abutment member and supporting the same in an elevated position above the ground and well above said support elements.

4. A stalk and straw bunching attachment for combines and the like comprising a horizontally extending frame adapted to be drawn over the ground adjacent the discharge of the combine in such position to receive stalks or straw therefrom, said frame having opposed upstanding side members thereon, a plurality of spaced rearwardly extending support elements connected to the forward portions of said frame and extending rearwardly therefrom, abutment means carried by the rear portion of said frame and being controllably releasable to permit accumulations of straw accumulated thereby to be released as desired, and a plurality of guard members each of which has a forward portion, a medial portion, and a rearward portion and each of which is connected by its forward portion to the rear portion of one of said support elements and extends upwardly therefrom in elevated relation to the ground, the rearward portions of said guard members extending downwardly from the medial portion into contact with the ground, the medial portion of said guard members being depressed to receive said abutment member therein in elevated position relative to the ground.

References Cited in the file of this patent

UNITED STATES PATENTS

| Number | Name | Date |
|---|---|---|
| 537,367 | Shimp | Apr. 9, 1895 |
| 1,153,842 | Eckardt | Sept. 14, 1915 |
| 1,355,014 | Swayze | Oct. 5, 1920 |
| 2,221,719 | Peterson | Nov. 12, 1940 |

FOREIGN PATENTS

| Number | Country | Date |
|---|---|---|
| 545,352 | Great Britain | May 21, 1942 |